Feb. 15, 1927.　　　　　F. LEISER　　　　1,618,097
PAN
Filed March 22, 1926
Fig.1.
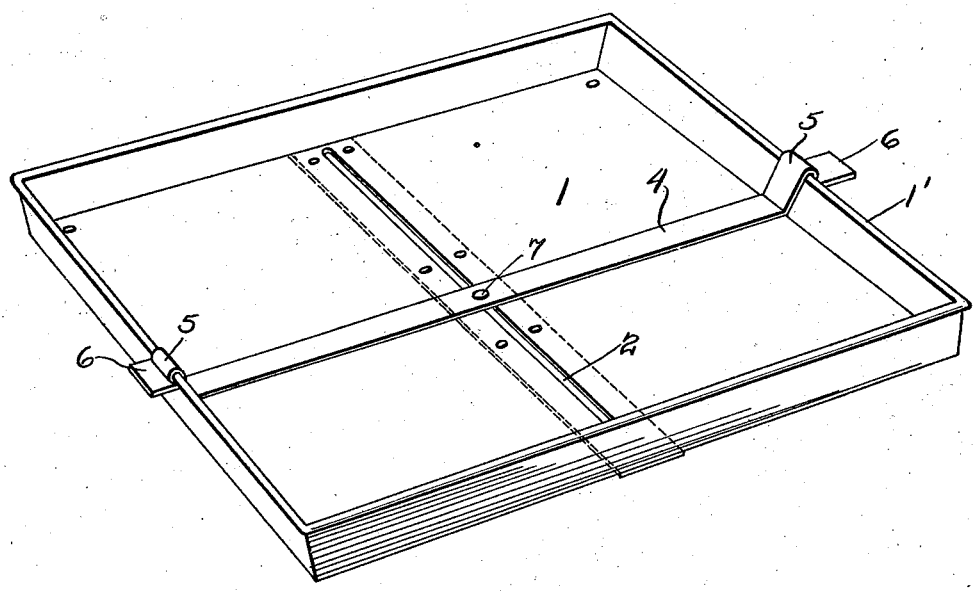
Fig.2.
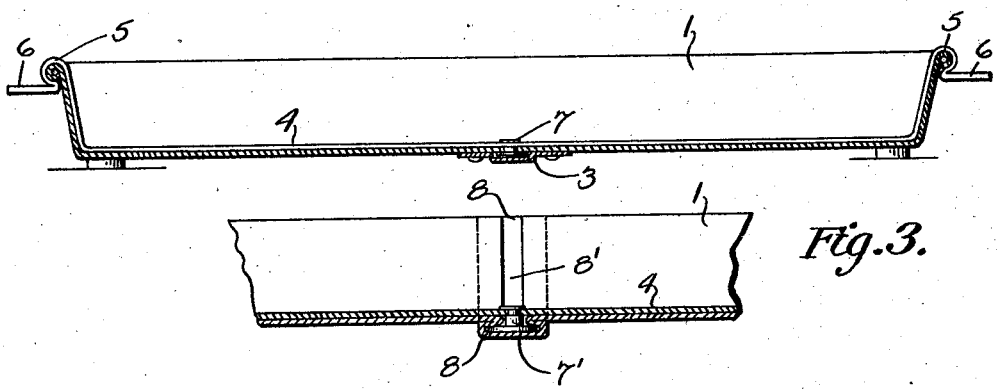
Fig.3.
Florence Leiser
INVENTOR
BY Victor J. Evans
ATTORNEY Patented Feb. 15, 1927.

1,618,097

UNITED STATES PATENT OFFICE.

FLORENCE LEISER, OF MADISON, WISCONSIN.

PAN.

Application filed March 22, 1926. Serial No. 96,603.

This invention relates to improvements in pans used for baking and the like, the principal object of the invention being to provide means for loosening the cake or other article placed in the pan from the bottom of the pan, so that the article can be easily removed from the pan and without danger of breaking the article.

Another object of the invention is to attach the separating member to the pan so that there is no danger of it becoming detached and lost.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view showing the invention applied to a pan.

Figure 2 is a sectional view through Figure 1.

Figure 3 is a detail sectional view showing a modification.

In these views, 1 indicates a pan which is provided with a transverse slot 2 in its bottom, a strip 3 being fastened to the under face of the bottom to enclose the slot and thus prevent material placed in the pan from escaping through the slot. A cutter strip 4 is slidably arranged in the pan and has its ends passing up over the ends of the pan and said ends are bent over to form the loops 5 for engaging the bead 1' of the pan and then the ends of the strip are bent outwardly to form the handles 6. A headed rivet 7 is slidably mounted in the guideway formed by the groove 2 and the strip 3 and this rivet is attached to the strip 4.

Figure 3 shows the guideway as composed of a loop 8 formed in the bottom of the pan at the center thereof to receive the rivet 7'. This guideway extends up the sides of the pan, as shown at 8' so that the rivet can be placed in position before the sides of the pan are bent upwardly.

From the foregoing it will be seen that after a cake has been baked, and it is desired to remove the cake from the pan, by moving the strip 4 across the bottom of the pan, the cake will be detached from the pan so that it can be easily removed therefrom and there will be no danger of the cake breaking while being removed. In other words, the strip 4 acts as a cutter to cut the bottom of the cake from the bottom of the pan. The strip is moved by grasping the handles 6, the loops 5 acting as guiding means and the rivet and the guideway also act as guiding means, and these parts hold the srtip to the pan so that there is no danger of the strip being displaced and lost.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a pan having a transverse slot in its bottom, a cover at the bottom of the pan for enclosing the slot, a cutter strip slidably mounted in the pan and having its end portions projecting from the pan and forming handles and a member sliding in the slot and connected with the cutter strip.

2. In combination with a pan having a transverse slot in its bottom, means for enclosing the lower portion of the slot, said slot and covering means forming a guideway, a cutter strip, a rivet fastened to the same and sliding in the guideway, the ends of the strip extending up over the ends of the pan and being looped to engage the bead at the top of the pan with the extremities of the strip extended to form handles.

In testimony whereof I affix my signature.

FLORENCE LEISER.